June 29, 1954 — H. BOUTILLON — 2,682,368
INDICATOR-CALCULATOR
Filed Feb. 20, 1952 — 4 Sheets-Sheet 1
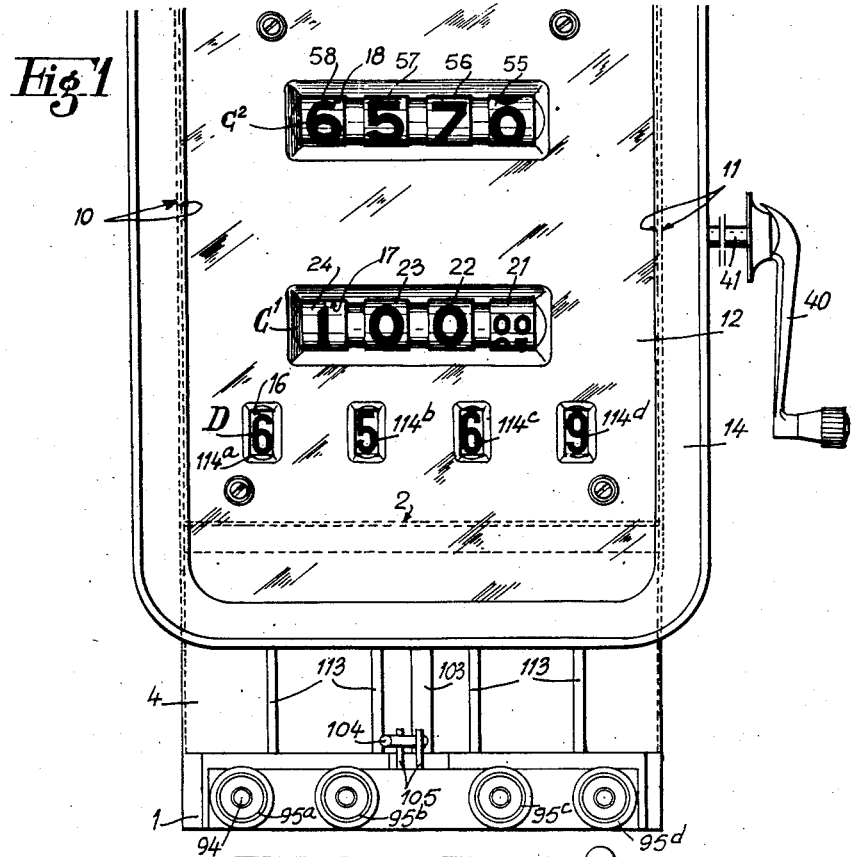
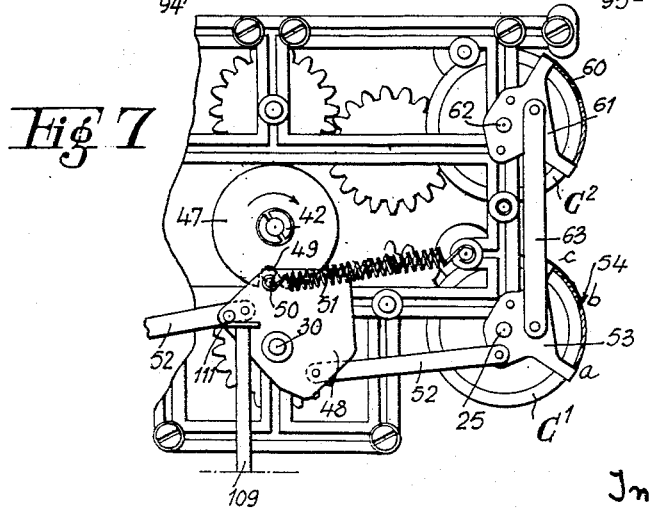
Inventor:
HENRI BOUTILLON
by: J. Delattre-Seguy
Attorney June 29, 1954

H. BOUTILLON 2,682,368

INDICATOR-CALCULATOR

Filed Feb. 20, 1952

Inventor,
HENRI BOUTILLON
by: [signature]
Attorney

June 29, 1954     H. BOUTILLON     2,682,368
INDICATOR-CALCULATOR
Filed Feb. 20, 1952     4 Sheets-Sheet 3
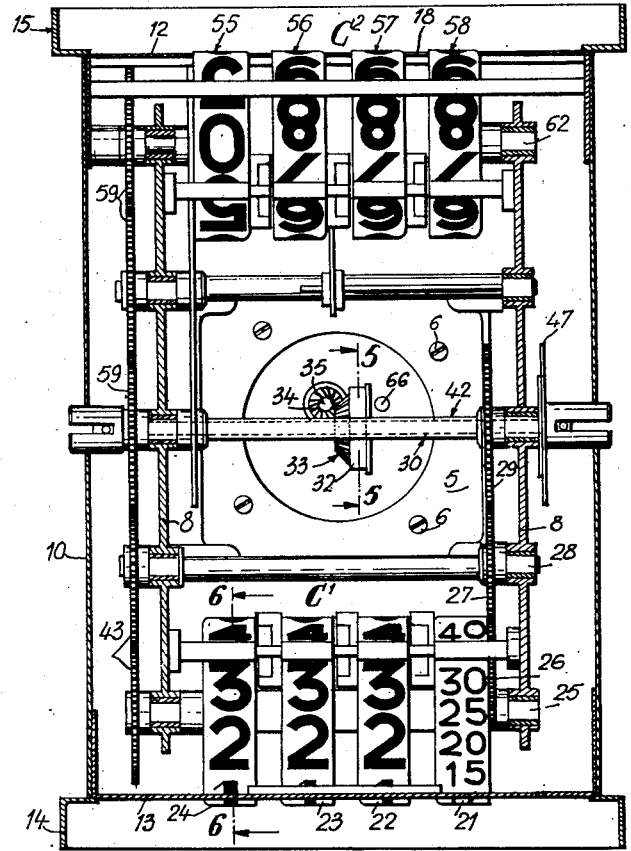
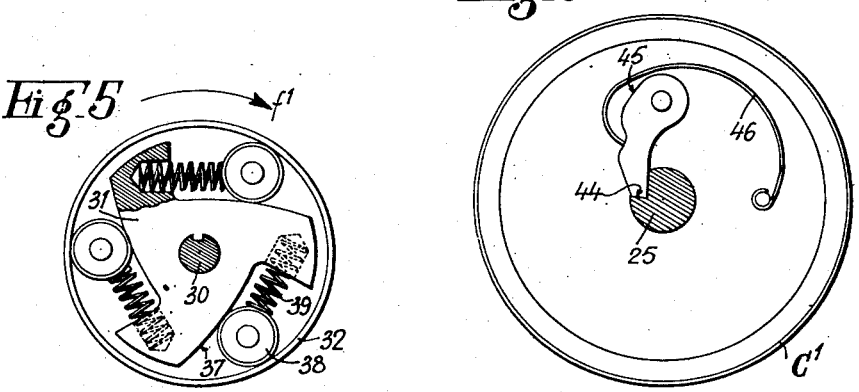
Inventor:
HENRI BOUTILLON
by: J. Delattre-Seguy
Attorney

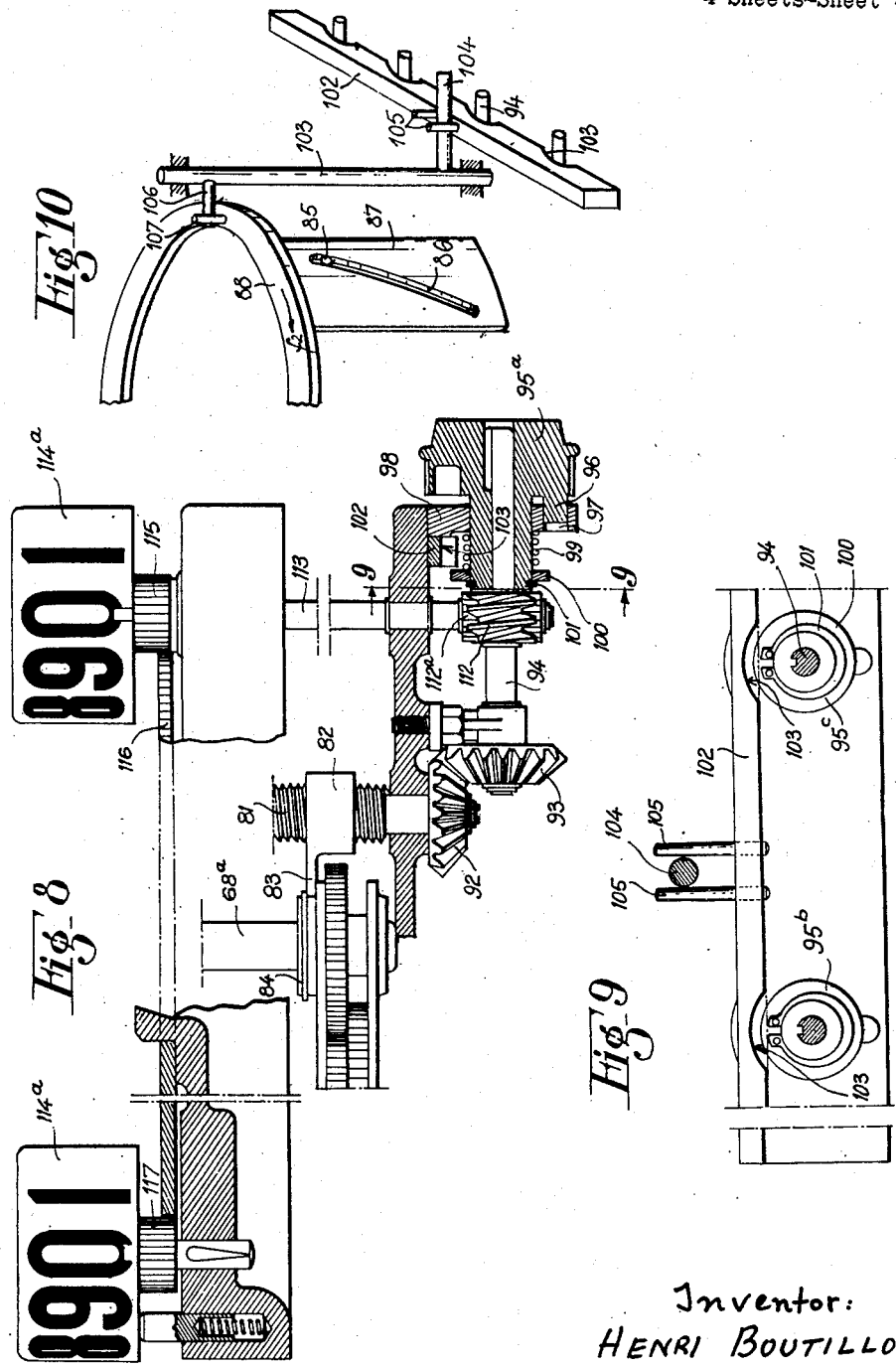

Patented June 29, 1954

2,682,368

UNITED STATES PATENT OFFICE 2,682,368

INDICATOR-CALCULATOR

Henri Boutillon, Suresnes, France, assignor to Etablissements Boutillon S. A., Suresnes, France, a French body corporate Application February 20, 1952, Serial No. 272,575

Claims priority, application France February 22, 1951

9 Claims. (Cl. 235—61)

The present invention relates to apparatuses that indicate the quantity supplied of a given merchandise measured by weight, volume or units, and to calculators of the price to be paid by the buyer, these apparatuses co-operating with an instrument for measuring said merchandise, specifically a continuous volumetric measurer when this merchandise is a liquid (a fuel for instance).

A known type of indicator-calculator includes two indicating mechanisms formed each one, from one or two counters in parallel, this or these co-axial, cylindrical and numbered drum counters being situated on one or on both sides of the apparatus.

One of the indicating mechanisms having one or two counters in parallel is driven directly by a driving member connected to the merchandise measuring instrument; this first indicating mechanism indicates the amount of merchandise supplied. The other mechanism is driven by the same driving member but with the interposition of a gear drive device having a ratio that is variable and moldifiable at will, said ratio being proportional to the value of the unit price considered.

The rotative speed of this second mechanism is, therefore, a multiple or submultiple of that of the first mechanism. It constitutes the indicator of the price to pay.

In this known type of apparatus, the variable ratio gear drive device comprises in combination: a series of gear wheels, arranged as a cone of co-axial gears fixed in rotation, the numbers of teeth of which are proportional to the first nine whole numbers, as many slide pinions as there are orders of unity in the drive ratio to be obtained, and an individual support for each of said pinions, this support which is shiftable by hand after the apparatus housing has been opened being rotatably and slidably mounted on a shaft parallel to the shaft for said cone of gears in a manner that, by traversing said support, the corresponding pinion may be brought opposite any one of the gear wheels of the cone of gears, and by oscillating said support said pinion may be engaged or disengaged with the gear wheel opposite which it is placed.

The invention has for its object to provide an apparatus of the above described type improved to permit in particular a more convenient changing of the unit price, and an automatic indication and locking thereof that ensures the correct operation of the apparatus, that is to say, preventing any possibility of fraud.

The invention has in particular for its object to provide an apparatus in which there is provided for each rotatable and slidable support of a slide pinion for the variable ratio drive device external actuating means connected through gear trains on the one hand to said support for purposes of provoking the longitudinal displacements parallel to the axis of the cone of gears and, on the other, to a numbered drum that indicates at each instant the multiplication ratio of the drive obtained.

Owing to the fact that the actuating or control means are placed outside, the shifting of the variable ratio drive device may be effected very rapidly without having to open the apparatus, which may, therefore, be sealed or in any case closed in a manner to inspire absolute confidence on the part of the buyer regarding the exactitude of the calculations performed by the apparatus.

Further, due to the fact that each control member is connected to the traverse movements of the slide pinion support, the displacement of this member for passing the slide pinion from any one gear wheel to one of the adjacent gear wheels is constant. It follows that the same occurs for the rotation of the numbered drum indicator of the figure corresponding to the ratio obtained. This drum may, then, possess figures disposed according to a constant angular spacing, a necessary and sufficient condition for showing the drum figures, one by one, behind the window of a fixed dial.

Other features of the invention will be apparent in the following description.

In the accompanying drawing given only by way of example:

Fig. 1 is a view in elevation of an apparatus in accordance with the invention.

Fig. 2 a vertical section thereof, this section being on line 2—2 of the Fig. 3.

Fig. 4 is a horizontal section of the counter mechanism to a larger scale than that of Figs. 1 to 3 and is along the line 4—4 in Fig. 2; however, in the upper part of the figure, one of the two upper counters of the price to pay indicator (these counters being above this horizontal plane) has been shown in plan.

Figures 2, 3:
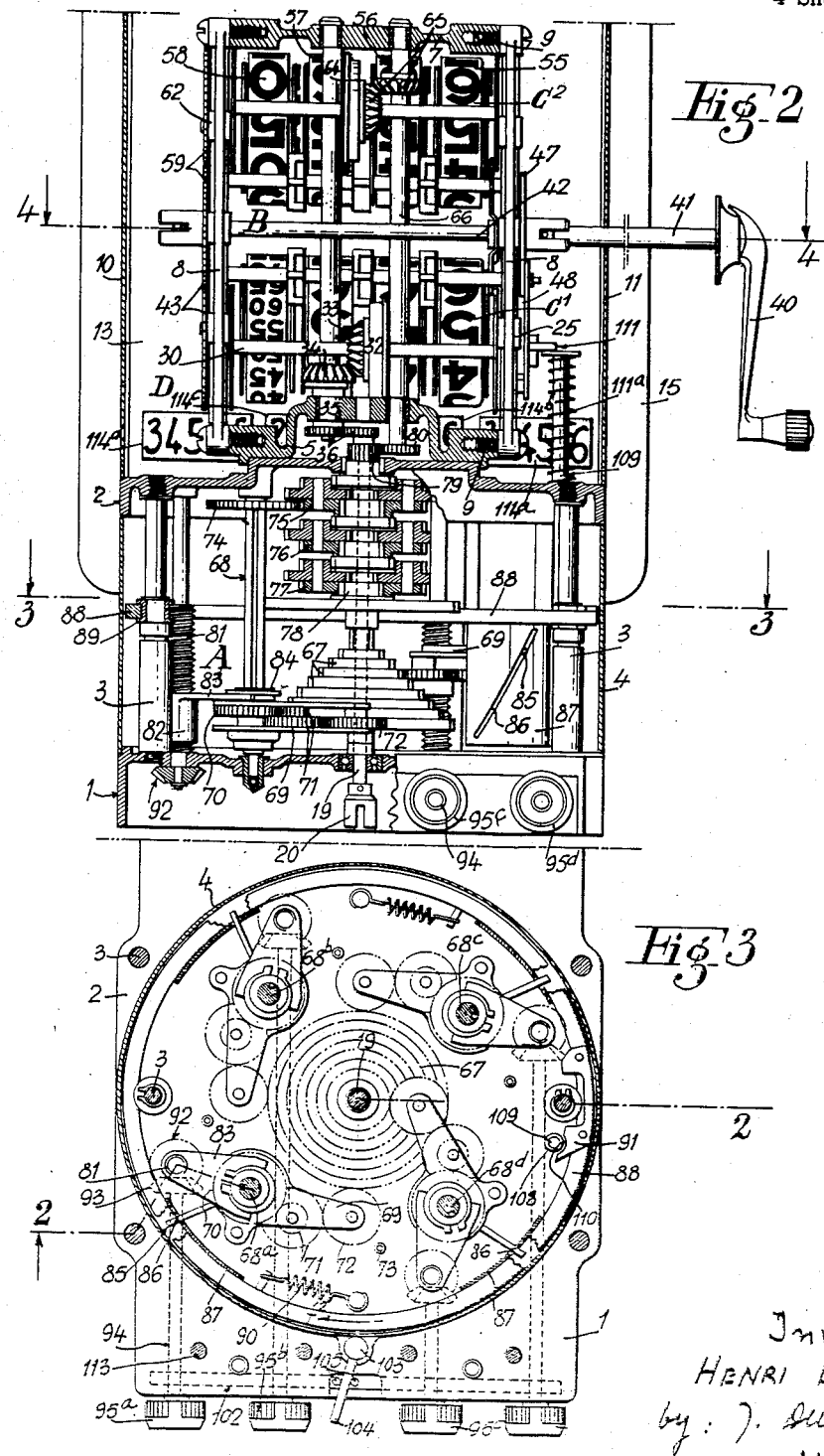
Fig. 3 is a horizontal section thereof on line 3—3 in Fig. 2.

Figs. 5 and 6 are partial vertical sections, on lines 5—5 and 6—6 of Fig. 4, but to a larger scale.

Fig. 7 shows in elevation a portion of the zero-setting mechanism for the counters.

Fig. 8 is a partial vertical section of the unit price changer device and of the indicators of this price.

Fig. 9 is a partial vertical section on the line 9—9 of Fig. 8.

Fig. 10 is a partial perspective view of an interlocking device between the lock of the control members for the variable ratio drive device and a rotative ring permitting the engagement and disengagement of all the slide pinions at the same time.

I. DESCRIPTION OF THE APPARATUS

(a) General remarks

The apparatus comprises (Figs. 1, 2, 3) a frame forming two superposed cases A and B (Fig. 2).

The lower case A is constituted by the combination of a stand 1, a plate 2 parallel thereto, a certain number of spacing pillars 3 joining this stand to said plate, and a housing 4.

The upper case B is formed by the combination of a bottom 5 (Figs. 2 and 4) fitted to the plate 2 to which it is secured by screws 6 (Fig. 4), a top 7, and two vertical side plates 8 secured by screws 9 to the bottom 5 and the top 7.

The assembly of the frame thus constituted is covered by a prismatic cover having four vertical faces formed by two side panels 10, 11 and two front panels 12 and 13. These last panels surrounded by frames 14, 15 constitute dials, each one of which has:

(1) A series of lower openings 16 (Fig. 1) through each of which appears the figure of one of the orders of unity of the multiplication ratio, "revcounters" with drums having large figures 69 centimes" (Fig. 1).

(2) A large central window 17 through which the volume or other quantity supplied may be read off.

(3) A large upper window 18 for the reading of the price to pay.

The apparatus being double-sided, that is having two dials, the upper case B contains:

(1) In the region of each of the two central windows 17 a counter $C^1$ for the volume (or other quantity) supplied; the two counters $C^1$ in parallel constitute, then, the indicator of the quantity supplied;

(2) In the region of each of the two upper windows 18, a counter $C^2$ of the total price; the two counters $C^2$ in parallel constituting, then, the indicator of the total price to be paid.

The two counters are of the known type termed "revcounters" with drums having large figures so arranged as to appear successively either in the window 17 or in the window 18.

The two lower counters in parallel $C^1$, adapted to indicate the volumes or other quantities supplied are driven, through the medium of a fixed and invariable ratio gear train, by a vertical shaft 19 (Fig. 2) that emerges from the apparatus through the stand 1 and is provided with means 20 for the connection thereof to an output shaft of a continuous volumetric or other measuring device not shown.

The two upper counters in parallel $C^2$ adapted to indicate the price to pay are driven by the same shaft 19, but through a gear drive device having a variable ratio and being adjustable to any desired value, between certain limits so that the speed of these counters $C^2$ is always a multiple of that of the first counter $C^1$. This speed ratio, or multiplication factor corresponds to the unit price, for example the unit volume of the liquid measured out.

This gear drive device, hereinafter described, is housed in the lower compartment A.

Lastly, drum indicators D are provided in parallel, each one having as many drums as there are digits in the proposed unit price, these drums appear before the lower openings 16 of the panels 12 and 13 and are disposed above the plate 2 outside the upper case B;

(b) Counter indicators $C^1$ for the volumes or other quantities supplied

Each of these counters, specifically adapted to the summing of the volumes in the shown example, has four counter indicators 21, 22, 23 and 24 (Figs. 1, 4) mounted on the same spindle 25. These drums, when measuring volumes, are graduated in litres with the exception of the first from the right 21 that rotates with a continuous motion and carries a series of numbers 00, 05, 10, 15 . . . 85, 90. This first drum accomplishes one complete rotation for each litre supplied.

Said drum 21 possesses a gear wheel 26 (Fig. 4) in mesh with an idler gear wheel 27. This gear wheel 27 is mounted free on a spindle 28 and is driven in rotation by another gear wheel of the same diameter 29, keyed to a central horizontal shaft 30.

Towards the middle of its length the shaft 30 carries keyed thereto, a hub piece 31 (Fig. 5) around which is adapted to revolve without clearance a ring 32. This ring is solid with a bevel gear pinion 33 in mesh with a second bevel pinion 34 keyed to a vertical shaft 35. This shaft is connected through a gear train 36 (Fig. 2) to the shaft 19 that is adapted to be driven by the volumetric measurer.

The hub 31 (Fig. 5) is connected to the ring 32 by a free-wheel mechanism so that this ring in revolving in the direction of the arrow $f^1$ drives the shaft 30, whereas a controlled rotation of this shaft 30 in this direction has no effect on the ring.

This free-wheel is realized, for example, in the following way: The hub piece 31 has three notches 37 in the shape of a spiral wherein are lodged rollers 38 loaded by springs 39 and in contact both with the ring 32 and the sloping portion of the hub piece 31. As hereinbefore mentioned, when the measurer drives in the direction of the arrow $f^1$ the ring 32 through the aforementioned bevel gears 33 and 34, the rollers 38 become wedged between the spiral-shaped slopes 37 and the ring 32, and the whole assembly is caused to rotate as a block without any slip being possible, for the angle between the tangent common to the roller and the slope and the tangent common to the roller and ring is much smaller than the characteristic friction angle of the metals employed.

But when zero-setting, as will be hereinafter explained, the hub 31 is driven in the direction of the arrow $f^1$ while the ring 32 is retained by the resistance of the measuring device, and said hub 31 and the rollers 38 rotate together by smoothly sliding inside the ring 32.

The shaft 30 being thus driven in the normal direction by the measuring device, drives the two centilitre drums 21 of the counters $C^1$ by means of gears 29, 27, 26. The four drums 21 to 24 of each counter are interconnected, in the known manner, so that a single rotation of each one causes one tenth of a rotation of the drum of the order of unity immediately higher.

The graduations are so disposed that the number visible on a drum through the reading window 17, increases sharply by one when the drum of the decimal place immediately inferior passes from "9" to "0."

(c) Zero-setting mechanism (Figs. 1, 2 and 7)

This known type of mechanism is only being described because of its relation, hereinafter defined, to the control mechanism permitting the drive ratio between the shaft 19 and the drums $C^2$ of the price indicator to be varied. This mechanism comprises essentially an exterior handle 40 that drives, through the shaft 41 thereof, a horizontal shaft 42, this shaft 42 in turn drives, through an intermediary gear train 43 disposed in a vertical plane on the side of the frame, the shafts 25 of the two counters $C^1$ in the normal direction of rotation of the drums.

The two shafts 25, fixed during the normal functioning, effect therefore a little more than a complete rotation during the zero-setting operation. Each of said shafts 25 possesses, as is known, a longitudinal groove 44 (Fig. 6) that is adapted to block the passage of a pawl 45 mounted inside each numbered drum and urged against the shaft 25 by a spring 46.

All the drums are, therefore, driven by the shaft 25 through the fraction of a turn necessary for bringing them to zero at the end of the motion. During the motion, in each of the counters $C^1$, the centilitre drum 21 drives, in the normal direction, through the intermediate gears 26, 27, the shaft 30 and the hub 31 which slides inside the ring 32 retained by the resistance of the measuring device, as hereinbefore explained.

Further, a cam 47 (Figs. 2 and 7) keyed to the shaft 42 provokes the oscillation of a rocker 48 (pivotably mounted on a bush on the shaft 30) by causing a notch 49 to engage and displace a finger 50 riveted to the rocker, in opposition to a return spring 51. During the period of setting to zero, the finger 50 rests against the periphery of the cam 47. When this cam has undergone a little more than a complete rotation, the finger 50 penetrates again the notch 49 of the cam thereby permitting the rocker to return to its original position upon bringing the cam back slightly, under the action of the spring 51.

Two connecting links 52 (Fig. 7) connect the rocker 48 to the supports 53 of two shutters or screens 54 concentric with the drums 21, 22, 23, 24 in such a manner that the figures on the drums are masked during the whole duration of the zero-setting operation and are only unmasked by the reverse rotation of the rocker after the drums have been set to zero. To this end, each screen 54 is constituted by a cylindrical portion co-axial with the drums, each screen is in a material transparent on the half $ab$ of its angular extent and semi-opaque on the other half $bc$ due to, for instance, a coating. It is the semi-opaque half $bc$ that masks the drums during the zero-setting and prevents any reading of the drum figures while permitting, however, a sufficient view of the drums to check that the zero-setting is being effected normally. It is the transparent half $ab$ that is situated opposite the drums during the normal operating position (shown in Fig. 7) thereby permitting a reading while at the same time protecting the drums against any exterior material injury.

(d) *Counter-indicators of the price to pay*

Their two series of drums 55, 56, 57, 58 (Figs. 1, 2, 4) are placed as, hereinbefore stated, above those of the volume indicator.

These drums are identical in construction, disposition and operation to those of said indicator of the volume or other quantity supplied.

They are graduated in francs, the graduation unit is 1 franc.

They are set to zero simultaneous with the indicator of the volume or other quantity and in the same way, by using the shaft 42 through the set of gears 59.

As with the counters $C^1$, masking shutters 60 (Fig. 7) permit the drums to be masked during the return to zero. These shutters are carried by supports 61 oscillably mounted on the shafts 62 of the counters $C^2$ and they are connected by connecting rods 63 to the supports 53 of the shutters 54 for the drums of the counters $C^1$ of the indicator of the volume supplied.

The drum 55 of the franc units on each side of the case, is rotatably mounted and driven in rotation by a single direction-clutch 64 (Fig. 2), a pair of bevel gears 65 and a vertical shaft 66, in exactly the same way as the centilitres drum 21 of each counter $C^1$. The vertical shaft 66 receives its motion from the multiplication device hereinafter described.

(e) *Multiplication and speed variation device* (*Figs. 2, 3*)

This device is contained in the compartment A of the stand.

The central vertical shaft 19 driven by the volumetric measuring device, carries keyed thereto a cone of nine gear wheels 67 the numbers of teeth of which are proportional to the first nine numbers, the smallest gear having eight teeth and the largest having seventy-two.

About the central shaft 19 are disposed four identical vertical shafts $68^a$, $68^b$, $68^c$, $68^d$ each one of which carries a slidable support 69 adapted to oscillate and slide freely on said shaft. Inside each slidable support is a pinion 70 slidably keyed on the corresponding shaft 68. The slidable support 69 also carries an idler pinion 71 and an end pinion 72, termed "slide pinion"; these pinions are in mesh. It can be clearly seen that by the oscillation and the vertical sliding of the slidable support 69, the slide pinion 72 may be engaged with any of the nine steps of the central gear wheels 67 with the result that the shaft $68^a$, $68^b$, $68^c$, or $68^d$ has imparted thereto a rotational speed proportional to that of the central shaft 19, the speed ratio being chosen at will between zero and nine. The zero speed is obtained by placing the slidable support 69 in its extreme bottom position where a fixed finger 73 immobilises the slide pinion 72.

Each shaft $68^a$ to $68^d$ carries keyed thereto, above the slidable support 69 a pinion 74 (Fig. 2) that is in constant engagement with the input gear wheel 75 of a planetary differential rotating freely about the central shaft 19 above the stepped gear wheels 67. There are three planetary differentials stacked along the shaft 19. The input gear of the top differential is driven by the shaft $68^a$ operating the tens of francs, the input gear 76 of the middle differential is driven by the shaft $68^b$ operating the units of francs, the gear 77 of the bottom differential is driven by the shaft $68^d$ operating the tenths and, lastly, the central pinion 78 of the bottom differential is driven by the shaft $68^c$ operating the hundredths of francs.

The multiplication ratio relative to each differential is so arranged that the speeds of the four shafts $68^a$ to $68^d$ be multiplied by 10, 1, and 0.1 and 0.01 respectively then added algebraically on the output pinion 79 of the top differential. This pinion is in mesh with a pinion 80 keyed on the lower end of the vertical shaft 66 that drives the drums indicating the price to pay of the counters C².

The assembly and the maintaining in correct position of the slidable supports 69 are obtained in the following manner (Figs. 2, 3, 8):

By the side of each shaft 68ª to 68ᵈ is a vertical screw 81 threaded upon which is a nut 82 having an extended portion in the shape of a fork 83. This fork surrounds a collar 84 on the slidable support 69, so that when the screw 81 is rotated said support 69 may be made to rise or descend. This support carries, lastly, a radially extended rod 85 that is engaged in an oblique slot 86. This slot is cut into a plate 87 (Figs. 2, 3, 10). This plate is rigidly fixed under a circular ring 88 guided by rollers 89 mounted on the posts 3 of the frame. The shape of the oblique slots 86 is such that when the slidable support 69 is vertically displaced by the action of the screw 81 and the nut 82, the slide pinion 72 thereof moves parallel to the conical surface through the mean diameters of the central cone of gears 67.

The ring 88 by rotating a fraction of a turn to the right or left provokes thus the simultaneous engagement or disengagement of the four slide pinions 72.

Two springs 90 (Fig. 3) constantly retain the ring 88 in the engaged position of the slide pinions 72 and the extent of the angular movement thereof is limited in the two directions by a stop 91 (Fig. 3) in the shape of a U adapted to encounter one of the posts 3.

At the lower end of each screw 81 is fixed a bevel pinion 92 which meshes with a bevel pinion 93 fixed on a horizontal shaft 94. Each shaft has at the protruding end a knurled knob 95ª, 95ᵇ, 95ᶜ, or 95ᵈ, slidably keyed on the shaft and carrying a lug 96 (Fig. 8) that is adapted to engage in the hole 97 of a guide piece 98 fixed to the frame I when the knob is displaced to the left under the action of a spring 99 bearing against the piece 98 and a washer 100 threaded onto the knob 95 and maintained by a spring clip 101.

The pinions 92 and 93 are equal and the pitch of the thread of the screw 81 is equal to the height of each step in the cone of gears 67. Hence the speed ratio for each shaft 68ª to 68ᵈ varies by one when the corresponding knurled knob 95ª to 95ᵈ effects a complete rotation.

Each knob is ordinarily immobilized by the lug 96 thereof. In order to rotate the knob, it is first necessary to pull it outwardly so as to disengage the lug 96, but this axial displacement is prevented, during the normal functioning of the apparatus, by the washer 100 secured to the knob which butts against a bar constituting a lock bar 102 (Figs. 3, 8, 9, 10) along the whole length of the horizontal space occupied by the four knobs and the axes thereof.

Said lock bar 102 possesses four notches 103 that permit the passage of the washers 100 when the lock bar has been displaced longitudinally to the position shown in Fig. 10. The lock bar 102 and the ring 88 are connected by an interlocking device in a way that the lock bar is only disengaged when the ring 88 occupies an angular position wherein all the slidable pinions 72 are separated from the stepped gear wheels 67. This interlocking device has a vertical rod 103 (Figs. 1, 3, 10) journalled in the frame. This rod has a leg 104 by means of which said rod may be oscillated, said leg being engaged between two pins 105 on the lock bar 102. Said rod has a further leg 106 (Fig. 10) adapted to bear against a pin 107 carried by the ring 88 for purposes of oscillating said ring against the action of springs 90 in the direction of the arrow $f^2$ (Fig. 3).

Further, the ring 88 itself is locked in the position of engagement of the slide pinions 72 with the gear wheels 67, by a boss 108 (Fig. 3) carried by a rod 109 and which penetrates in a notch 110 in the stop 91 for a vertical position of this rod. Said rod is actuated at the upper end by a lug 111 of the zero-setting rocker 48 and is urged upwardly by a spring 111ª in such a way that the boss 108 of the rod 109 is ordinarily in the notch 110 of the stop 91 thereby blocking the movement of said stop and the ring 88. Said ring is only freed during the zero-setting, the boss 108 being then lowered below the stop 91 by the action of the lug 111 of the rocker 48 on the rod 109.

Lastly, each of the four shafts 94 having a control knob possesses, keyed thereon, a single thread worm 112 (Fig. 8) that is meshed with a worm wheel 112ª fixed to the lower end of a shaft 113 (Figs. 1, 3, 8) the upper end of which carries one of the four drums 114ª to 114ᵈ numbered from 0 to 9 of the indicator D which automatically indicates on the dial behind the lower windows 16 the number corresponding to the multiplication factor employed.

Four other numbered drums placed on the other side of the indicator and individually connected to the first four repeat the indicated unit price on the other side through a train of gears 115, 116, 117 (Fig. 8).

The above-described mechanism enables a unit price varying by 0.01 franc from 0 to 99.99 francs to be employed.

II. OPERATION OF THE APPARATUS

It is seen that due to the locking of the ring 88 by the rod 109 it is impossible to pull and turn the knobs 95ª to 95ᵈ while the apparatus is functioning, for they are at this time blocked by the lock bar 102 itself held by its engagement with said ring through the rod 103, the legs 104, 106 and the pins 105, 107.

In order to change the unit price, a zero-setting operation must first be commenced without the completion thereof, which has for effect the masking of all the figures of the two indicators C¹, C² by the opaque portions of the shutters 54, 60 (Fig. 7) and the unlocking of the ring 88 by the lowering of the rod 109 by the lug 111 of the rocker 48. The exterior handle or leg 104 may then be moved which displaces the lock bar 102 the notches 103 of which move to the position of the rings 100 (Fig. 9) and allow the knobs to be pulled and turned. This moving of the handle 104 also causes the simultaneous angular displacement of the ring 88 and the disengagement of the four slide pinions 72 through the action of the slots 86 on the pins 85.

Once the price change has been effected it suffices to release the handle 104 to allow the ring 88 under the action of the return springs 90 to provoke at the same time the engagement of the slide pinions 72 and the locking of the knobs 95ª to 95ᵈ.

The zero-setting is then terminated, the ring is then itself again locked by the boss 108 of the rod 109 as hereinbefore explained.

It will be noticed that for a correct engagement, the knobs 95ª to 95ᵈ must always be rotated a whole number of turns since the pitch of the thread 81 that determines the level of the slide pinions is equal to the height of one step of the central cone of gears 67. If one of the knobs is not rotated a whole number of turns, the lug 96 thereof (Fig. 8) would not be opposite the corresponding hole 97 and it would not be possible to push this knob in the working position. In this event, the lock bar 102 as well as the ring 88 connected thereto would not be able to resume their working position. No slide pinion 72 is engaged, the price indicator mechanism C² does not operate and the drums thereof remain masked.

If during a price change correctly executed, one of the teeth of a slide pinion 72 wedges against one of the teeth of the central gear wheels 67 instead of falling into one of the roots of the teeth, the gearing together is immediately completed due to the fact that there occurs a sliding to the extent of half a tooth at this moment between the stepped gear wheels 67 and the slide pinion 72 which allows it to enter into correct engagement under the action of the return springs 90 attached to the ring 88, itself held by the engagement thereof with the rod 103, the legs 104, 106 and the pins 105, 107.

As can be seen from the above description, the indicator-calculator apparatus includes numerous safeguards:

1. Any zero-setting, once commenced, has to be finished since the shutters 54, 60 would not uncover the indicators until after the zero-setting is completed.

2. The indicators are covered during the whole period of the zero-setting operation.

3. The indication of the unit sale price appears automatically and invariably as a function of the multiplication employed.

4. The unit price change mechanism can only operate after the apparatus indicators have been covered, and the members of this mechanism are locked during the normal functioning of the apparatus.

5. In the event of an improper operation, the speed changer is locked in the active position and the indicators of the prices remain covered.

The invention is not limited to the precise details described and illustrated which have been given only by way of example.

It is obvious that the apparatus may include, without departing from the scope of the invention, the known type of totalizators registering the quantity of merchandise supplied and the price to pay, these totalizators being driven at a constant ratio by vertical shafts 33 and 66 respectively without zero-setting, these totalizators being provided with a shutter automatically maintained in the position of occulation during the duration of the zero-setting operation by coupling the shutter with one of the shutters 54.

The apparatus may, furthermore, be provided with a connection between the locking rod 109 and a stop valve or an electric switch or other equivalent device that automatically interrupts the operation of the measuring device by cutting off the supply therefor during the zero-setting operation.

Having now described my invention what I claim as new and desire to secure by Letters Patent is:

1. In an indicator-calculator apparatus of the type which comprises in a casing a gear drive device having a ratio that is regulatable and proportional to the value of the unit price to drive a total price indicator mechanism, this drive device comprising coaxial stepped gear wheels locked in rotation, a slide pinion for each order of unity of the unit price and for each slide pinion a support rotatably mounted on and slidable along an axis parallel to the axis of the stepped gear wheels and a numbered drum visible through a window of said casing and adapted to indicate the multiplication ratio of the gear drive device, in combination, with each of said supports and its drum, a control device which comprises a shaft rotatably mounted in said casing, a control knob keyed to said shaft outside said casing and a first and a second gear trains to connect in parallel said shaft respectively to the slide pinion support and to said drum, the first gear train ratio being such that said slide pinion is displaced from one of the stepped gear wheels to the next for one complete rotation of said control knob, while the second gear train ratio is such that said drum rotates one fraction of a revolution corresponding to one division of said drum for one complete revolution of the knob.

2. Indicator-calculator apparatus as claimed in claim 1 in which said control knob is slidably keyed to said shaft and is provided with a lug parallel to said shaft and adapted to lock said knob in rotation, the casing is provided with a hole in which this lug is adapted to engage for a given angular position of the knob and shaft, said shaft is provided with a shoulder and a spring is disposed around said shaft between the casing and said shoulder to return, for said given angular position of the shaft, said shaft and the knob to an idle and locked position so that the lug is then engaged in said hole, the lug being so fixed angularly to the control knob that for said given angular position, which is therefore a blocked position of the control knob, the corresponding slide pinion is in mesh with one of the stepped gear wheels.

3. Indicator-calculator apparatus as claimed in claim 2, in which a lock common to all the control knobs and comprising a bar having as many notches as there are control knobs in the apparatus, is mounted on the casing of the apparatus and is slidable across the knobs which are in alignment and each one of which carries a shoulder adapted to butt against this bar; whereby this bar prevents any movement of the knobs along their respective shafts and any disengagement of their locking lugs from the holes in the casing except when, by a longitudinal displacement of said bar, its notches are brought into line with said shoulders.

4. Indicator-calculator apparatus as claimed in claim 1 in which a circular ring is rotatively mounted concentric with the axis of the stepped gear wheels and is so connected to the rotative and slidable slide pinion supports that for a first angular position of this ring about this axis all the slide pinions are respectively in mesh with one of said stepped gear wheels, whereas for a second angular position of this ring all these pinions are out of engagement with said stepped gear wheels.

5. Indicator-calculator apparatus as claimed in claim 4, in which each slide pinion support is provided with a pin and the ring carries rigidly fixed thereto a piece for each pin that is provided with a slot in the form of a portion of a helix in which said pin is engaged, this portion of a helix being such that the path of the movement communicated to said slide pinion support when said pin is caused to move along this slot is such that the slide pinion engages successively with each of the stepped gear wheels.

6. In an indicator-calculator apparatus of the type which comprises in a casing a gear drive device having a ratio regulatable and proportional to the value of the unit price to drive an indicator mechanism for the total price, this device comprising a series of coaxial, stepped gear wheels solid in rotation having numbers of teeth that between them correspond to the first nine whole numbers, a slide pinion for each order of unity of the unit price, for each slide pinion a slide pinion support rotatably mounted and slidable along an axis parallel to said axis of said stepped gear wheels, and a numbered drum adapted to indicate the multiplication ratio of the drive employed by this slide pinion in combination: a circular ring rotatably mounted concentric with the axis of said stepped gear wheels and so connected to said slide pinion supports rotatably and slidably mounted that for a first angular position of this ring about said axis of the stepped gear wheels, all the slide pinions are respectively in mesh with one of said gear wheels whereas for a second angular position of said ring all these pinions are out of engagement with said gear wheels; for each slide pinion support slidably and rotatably mounted: an external control device, a first gear train to connect the external control device to said slide pinion support to ensure longitudinal displacements thereof parallel to the axis of the stepped gear wheels, and a second gear train to connect said external control device to said numbered drum; a retractable locking device to lock the control devices in such a position that each slide pinion is in engagement with one of the stepped gear wheels, and an interlocking device, which connects said circular ring with the locking device and which is so arranged that when the slide pinions are in mesh with the stepped gear wheels for said first angular position of the ring the control devices are locked, whereas they are unlocked when the slide pinions are separated from said stepped gear wheels for the second angular position of the ring.

7. Indicator-calculator apparatus as claimed in claim 6 in which said locking device comprises a slidable bar, two parallel pins being fixed on this bar, whereas one stop pin is fixed on said ring and at least one spring is adapted constantly to urge said ring to return to said first angular position, the interlocking device between said slidable bar and said ring including a rotative shaft and two arms fixed radially on said shaft, one of said arms being in engagement between said parallel pins carried by the locking bar and also forming a handle which permits said rotative shaft to be rotated about its axis, and the other arm being combined with said stop pin carried by the ring for displacing this ring in opposition to the action of said spring.

8. In an indicator-calculator apparatus that comprises a casing provided with windows on at least one of its sides, in this casing two indicator mechanisms each provided with at least one numbered drum counter visible through one of said windows, one of these mechanisms indicating the quantity of merchandise supplied and the other the total price to pay, a zero setting mechanism for said numbered drum counter and a gear drive device having a ratio regulatable and proportional to the value of the unit price to drive the indicator mechanism for the total price, this device comprising a series of coaxial, stepped gear wheels solid in rotation having numbers of teeth that between them correspond to the first nine whole numbers, a slide pinion for each order of unity of the unit price, for each slide pinion a slide pinion support rotatably mounted and slidable along an axis parallel to said axis of said stepped gear wheels, in combination: a circular ring rotatably mounted concentric with the axis of said stepped gear wheels and so connected to said slide pinion supports rotatably and slidably mounted that for a first angular position of this ring about said axis of the stepped gear wheels, all the slide pinions are respectively in mesh with one of said gear wheels whereas for a second angular position of said ring all these pinions are out of engagement with said gear wheels; for each slide pinion support slidably and rotatably mounted: an external control device, a numbered drum adapted to indicate the multiplication ratio of the drive employed by this slide pinion, a first gear train to connect the external control device to said slide pinion support to ensure longitudinal displacements thereof parallel to the axis of the stepped gear wheels, and a second gear train to connect said external control device to said numbered drum; a retractable locking device to lock the control devices in such a position that each slide pinion is in engagement with one of the stepped gear wheels; an interlocking device, which connects said circular ring with the locking device and which is so arranged that when the slide pinions are in mesh with the stepped gear wheels for said first angular position of the ring the control devices are locked, whereas they are unlocked when the slide pinions are separated from said stepped gear wheels for the second angular position of the ring and a rod connected to said zero-setting mechanism and combined with two abutments carried by said ring to immobilize the latter during the functioning of the apparatus in said first angular position corresponding to the meshing of the slide pinions with the stepped gear wheels and to the locking of the external control devices in their idle position, the ring being freed only during the zero-setting of said numbered drum.

9. Indicator-calculator apparatus as claimed in claim 8 in which said ring is provided with a notch, said zero-setting mechanism includes a lug adapted to be lowered during the zero-setting operation, said rod is placed vertically below said lug and carries a locking boss and a spring is adapted to maintain said rod in contact with said lug, said boss being so positioned along the rod that the boss is engaged in said notch provided in the ring so as to immobilize the latter when the zero-setting mechanism is in its idle position.

References Cited in the file of this patent

UNITED STATES PATENTS

| Number | Name | Date |
|---|---|---|
| 2,106,686 | Woodford | Jan. 25, 1938 |
| 2,151,239 | Slye et al. | Mar. 21, 1939 |
| 2,159,625 | Arnold | May 23, 1939 |
| 2,178,230 | Hazard | Oct. 31, 1939 |
| 2,190,626 | Orbeck | Feb. 13, 1940 |
| 2,199,480 | Carroll | May 7, 1940 |